United States Patent [19]

Sharma

[11] 4,276,316

[45] Jun. 30, 1981

[54] PROCESS FOR TREATING NUTS

[75] Inventor: Shri C. Sharma, Millington, N.J.

[73] Assignee: CPC International Inc., Englewood Cliffs, N.J.

[21] Appl. No.: 879,826

[22] Filed: Mar. 29, 1978

Related U.S. Application Data

[63] Continuation-in-part of Ser. No. 806,658, Jun. 15, 1977, abandoned.

[51] Int. Cl.³ .................. A23L 1/20; A23L 1/36; A23L 1/38
[52] U.S. Cl. .................. 426/466; 426/469; 426/472; 426/473; 426/482; 426/483; 426/509; 426/520; 426/524
[58] Field of Search ............... 426/288, 632, 419, 444, 426/465, 466, 469, 472, 481, 482, 483, 507, 510, 511, 520, 524, 473, 518, 633

[56] References Cited

U.S. PATENT DOCUMENTS

| | | | |
|---|---|---|---|
| 1,664,334 | 3/1928 | Thompson et al. | 426/482 |
| 2,278,941 | 4/1942 | Musher | 426/632 |
| 2,995,166 | 8/1961 | Burley et al. | 426/482 X |
| 3,077,217 | 2/1963 | Hind | 426/482 |
| 3,121,015 | 2/1964 | Avera | 426/633 X |
| 3,269,442 | 8/1966 | Gardner | 426/483 |
| 3,598,610 | 8/1971 | Hawley et al. | 426/482 X |
| 3,615,590 | 10/1971 | Avera et al. | 426/633 |

FOREIGN PATENT DOCUMENTS 210036  9/1924  United Kingdom .................. 426/482

*Primary Examiner*—Arthur L. Corbin

[57] ABSTRACT

A process including dry blanching of raw nuts is described. The nuts are heated with a gas at a temperature of 125° to 175° C. for 30 to 180 seconds and then immediately cooled to below 35° C. within 5 minutes prior to blanching. This provides improved blanching, sorting and other steps in a process for producing products ranging from nuts per se to peanut butters or spreads.

11 Claims, 3 Drawing Figures

PROCESS FOR TREATING NUTS

BACKGROUND OF THE INVENTION

This is a continuation-in-part application of United States Application Ser. No. 806,658 filed June 15, 1977, now abandoned.

Peanuts and other leguminous nuts are covered by skins or membranes. Enveloping each seed kernel of such a nut is a thin skin, dark colored on the outside and light colored on the inside. This skin consists chiefly of spermoderm with an inner layer believed to be endosperm. Nut skins have a porous, moisture-containing tissue structure. The skin tends to be bitter in taste and thus is desirably removed from the nut kernel or meat prior to consumption by "blanching".

In general, "blanching" refers to the removal of the skin or testa from the nut kernel. The known methods of blanching revealed in the prior art, can generally be classified into the following main categories, based on the vehicle used to weaken the bond between the skin and the kernel:

(a) Water blanching;
(b) Alkali blanching;
(c) Hydrogen peroxide blanching; and
(d) Dry blanching.

Each of these processes has their specific applications and merits.

Water blanching generally involves the use of scalding water, often in conjunction with mechanical slitting devices, and subsequent abrading of the treated nuts to remove the loosened skins. Water blanching is not considered to be desirable by many processors of peanuts for peanut butter. The water treatment may cause textural changes which adversely affect the organoleptic properties of the nuts.

Alkali blanching is usually accomplished by dipping the nut kernels in sodium hydroxide solution and thereafter washing them in a neutralizing solution. The skins may be removed from the wet nuts, or the kernels may be dried prior to removal. The taste and appearance of alkali treated nuts are often adversely affected.

During hydrogen peroxide blanching, the nut kernels are immersed in a hydrogen peroxide solution. The hydrogen peroxide is believed to decompose between the skin and cotyledon into water and oxygen, thereby loosening the skin and facilitating its removal. This process has drawbacks similar to those encountered in alkali blanching.

The preceding three blanching methods all require drying operations to reduce the moisture so that the water activity of the nuts or eventual end product is such that microbial growth will be inhibited. Consequently, and because of the organoleptic consequences of these "wet" processes, the dry blanching process is probably the most common single mode of blanching employed in nut processing.

The customary procedure for dry blanching has generally depended upon the nature of the desired product. To produce skinless raw whole nut kernels, for example, it has been common to mechanically slit or score the skins, heat the nuts to about 60° C. for about 30-60 minutes, and then remove the skins from the kernels by friction, as through gentle rubbing between brushes or ribbed rubber belting. To produce roasted nut products, roasting at about 170°-200° C. for 3-8 minutes normally occurs first in the sequence. The roasted nuts are cooled to at least about 30° C. and then mechanically blanched.

In a modification of these general dry blanching techniques, U.S. Pat. No. 2,995,166 of Burley et al. describes a process in which raw nuts are heated to 75° C. for 4 to 8 minutes under infra-red lamps to dry and rupture the skins. The nuts are then blasted with jets of cool air to complete removal of these skins. The cooling air evaporates the moisture that is on the surface of the nuts so that the skins are more brittle.

In dry blanching, a considerable reduction in kernel moisture (to less than about 4.5 percent for raw nuts having an initial moisture content of about 6% and to less than 1.5% for roasted nuts) has generally been believed necessary to achieve efficient skin removal. The heating/drying period for raw nuts may vary, depending upon the initial kernel moisture content, up to about 2 hours because it has usually been performed at low temperature in order that the flavor quality of the product would not be significantly impaired. Certain drawbacks of dry blanching include the fact that it is extremely time consuming, requires a high energy input involves a large capital investment for its specialized apparatus, and if not appropriately performed, can significantly impair the flavor of the nuts.

In addition to its use in the preparation of desirable nuts per se, blanching is also integral to many methods for forming processed nut compositions. Of these compositions, peanut butters are by far the most important. In a peanut butter spread or the like, it generally remains desirable to blanch the nuts so as to ensure against inclusion of the bitter taste characteristics of skins. In addition, it is preferred to avoid the speckled appearance skins can impart to the final product.

In conventional processes, peanut butter is generally prepared by roasting raw, shelled peanuts and then blanching them to remove their skins and nibs. The roasted-blanched peanuts may then be ground to the desired particle size and blended with other ingredients such as stabilizers, emulsifiers, sweeteners and salt. After blending, the mixture is cooled and packed into containers.

In a modification of this conventional technique, U.S. Pat. Nos. 3,121,015 and 3,615,590 of Avera et al describe processes in which this general sequence of steps is partially reversed. In Avera's process, peanuts are dried to 1-2% moisture, blanched and ground into a slurry before roasting. This process conserves energy and provides improved flavor.

In many of the commercial techniques for producing peanut butter, the process sequences also include—in addition to the major step functions set forth above—a sorting operation for removal of moldy and contaminated kernels. In conventional operations, sorting for the removal of contaminated kernels is performed on roasted, blanched peanut kernels which have already undergone brawning. Since the variation in roast color may be due to roast variation or kernel contamination and mold discoloration it becomes difficult to discern between good and contaminated kernels. In particular, roasting will have already darkened the peanut color so as to reduce distinctions between good and undesirable nuts. Therefore, in the electronic or manual color sorting of roasted peanuts, in order to ensure against toxicity, substantial quantities of good peanut kernels are inadvertantly removed and discarded with bad ones, but, still at times, some of the undesirable, contaminated kernels are retained in the "accept" stream, causing positive levels of aflatoxin in the edible product.

INTRODUCTION TO THE INVENTION

This invention relates to a novel method for dry blanching nuts. More particularly, raw nuts, such as peanuts, are thermally treated by heating with gas at temperatures of 125° to 175° C. for 30 to 180 seconds followed by rapid chilling to less than 35° C. The treated nuts may then be abraded or otherwise blanched to remove their skins.

This invention also relates to novel processes for utilizing the subject dry blanching method in the production of peanut butters. After blanching in which the kernels are split and the nibs are removed, the raw kernels are sorted with improved care and accuracy for removal of contaminated kernels. The remaining blanched peanut kernels may be ground and roasted, or roasted and then ground, for conventional final processing with an improved yield of acceptable peanut butter products.

DESCRIPTION OF THE INVENTION

Figure 1:
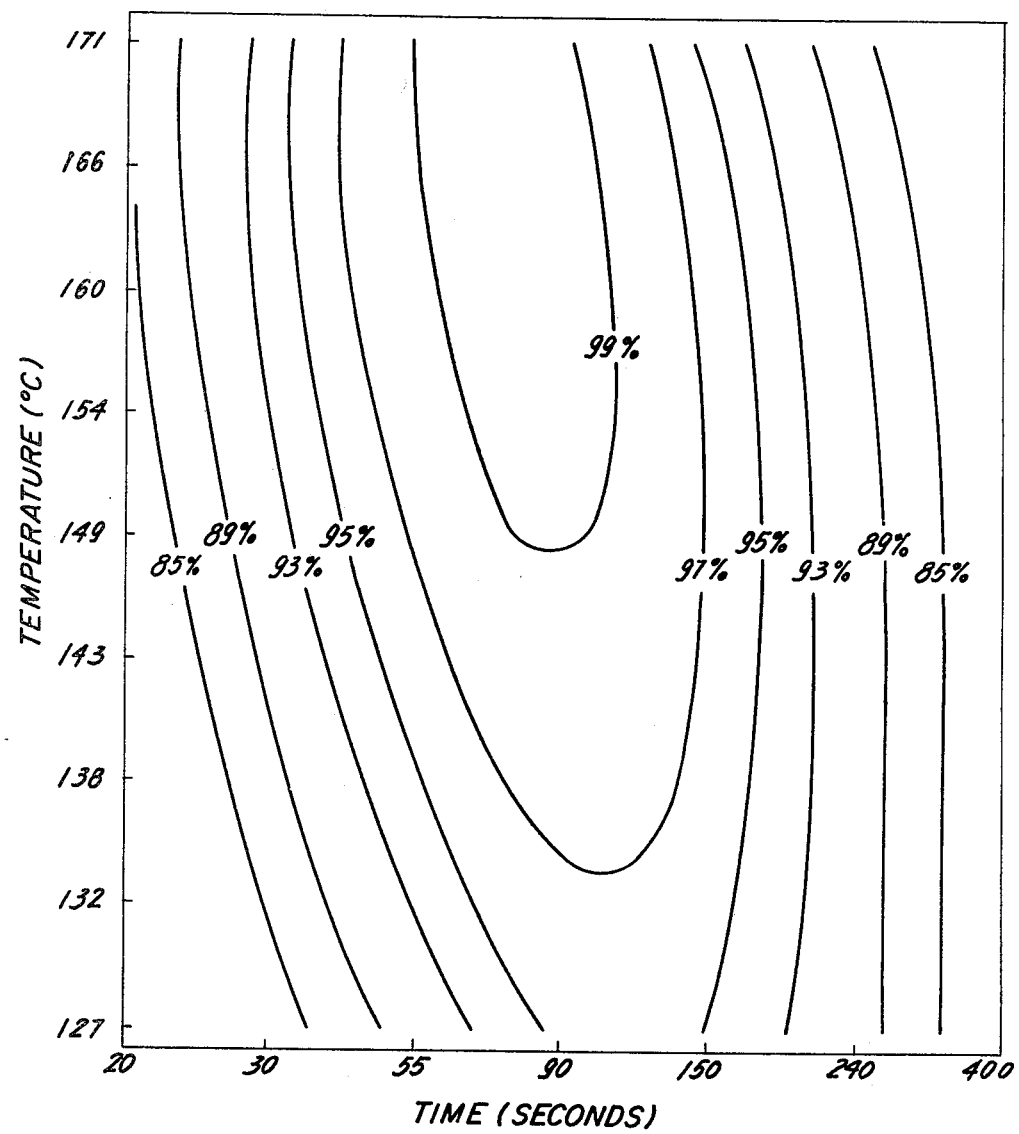
FIG. 1 is a response plot for blanching efficiency as a function of treatment time and temperature.

In the practice of this invention, raw nuts are dry blanched after a thermal pre-treatment which comprises subjecting the raw nuts to elevated, specific temperatures for relatively short durations, in a batch type or a continuous dryer (or roaster), with rapid cooling immediately following the heating treatment. During thermal treatment, micro- and macro-stress cracks are developed in the skin and/or the bond between the skin and the edible kernel is broken. As a result, the skins are loosened and can be easily removed from the kernel using any commercially available blanching device.

The specific parameters for the thermal pre-treatment vary within the ranges already set forth according to the type of the nuts. Optimum treatment parameters for peanuts for example will fall within the following conditions: a treatment period of 60 to 90 seconds with heated gas in the vicinity of 150° C., followed by rapid cooling to below about 25° C. in less than 5 minutes.

Depending on the desired end use of the product, the blanching step following the thermal treatment can be controlled to provide whole kernels or the split cotyledons by the degree of mechanical abrasion applied to the thermally treated nuts. In the production of peanut butter where it is unnecessary to keep the peanut kernel intact throughout processing, the removal of skins may ideally take place in a Bauer-type blancher wherein the cotyledons are split and the nibs are also freed from the raw nuts.

It is believed that the mechanism by which conventional blanching is facilitated through the subject thermal treatment lies in the differential in thermal expansion between kernel and skin, coupled with slitting or other physical operations that free the skin from the kernel. The importance of these aspects may best be seen by focusing upon each successively.

The coefficient of thermal expansion for peanut skins is in the range of from about $26.5 \times 10^{-5}/°C$. at 2.4% moisture to about $38.3 \times 10^{-5}/°C$. at 7.5% moisture while peanut kernels of about 50% oil content have coefficients of thermal expansion in the range of from about $55 \times 10^{-5}/°C$. to about $58.5 \times 10^{-5}/°C$. at like moisture contents. These figures tend to indicate that the kernel will expand or contract at about $1\frac{1}{2}$ to 2 times the rate of the peanut skin. Such a difference is sufficient to cause a substantial freeing of kernel and skin, if other factors do not interfere.

A key to utilizing the differential in rates of thermal expansion of kernel and skin appears to reside in the manner of heating. As already indicated, this portion of the subject thermal treatment should be performed between specific temperatures and be of only short duration. It has been discovered that these limitations are important for a variety of reasons. The direct consequence is that they permit removal of intact skins—i.e. unslitted and unscored kernel skins.

Limitation of significant moisture or other volatiles migration from the kernel to the skins is important both because it increases the differential in thermal expansion of skin and kernel and because it leaves the kernel itself in its essentially native state for further processing. In particular, loss of moisture from the kernel would cause a loss in resistance to mechanical stress lending to breakage and crumbling in subsequent steps.

It is similarly preferred not to cause any substantial alteration of the composition or color of the kernel by heating. In particular, roasting or the results of even partial roasting on kernel composition are desirably avoided. The kernel desirably remains essentially raw after this heating step.

Competing with the foregoing considerations are the necessities of heating the nuts for a period of time and to a temperature sufficient to cause substantial expansion of the nut kernels. It is not necessary to heat the kernel evenly throughout. The additional time which would be required for homogeneous heating, including the core volume of the kernel, is actually undesirable because of the possible alteration of kernel composition.

To meet these temperature demands, brief but effective exposures to elevated temperature are necessary. It has therefore been discovered that contact with a preheated gas is most efficatious for this heating step. For example, heating in a bed fluidized with a gas such as air, or more preferably an inert gas such as nitrogen or carbon dioxide, permits essentially complete control over, and instantaneous heating of, the nuts being subjected to thermal treatment. This allows maximum benefit with a minimum possibility of adverse side-effects.

Sufficient heating of the nuts may be obtained by contact with a gas at between about 125° C. and 175° C., preferably at about 150° C. Further, the time of heating or contact with the gas necessary for the objects of this invention is from 30 to 180 seconds, preferably from 45 to 150 seconds.

It is understood that the optima of the foregoing parameters may vary slightly with different kinds of nuts. Peanuts, for example, have been found to evidence a preferred range (taking into account both blanching and flavor efficiencies) of 143° to 155° C. for from 45 to 120 seconds. Such optima may, however, readily be determined with only minor experimentation.

Also of importance, the nuts are desirably cooled or chilled immediately after heating. This ensures a minimum exposure to the adverse effects of elevated temperatures. In addition, it contributes to the release or freeing of the skins from the nut kernels by causing a contraction phase during which the skins and underlying nut kernels experience different degrees of thermal expansion (here, actually, contraction). Moreover, during this period, the skins becoming generally unsupported and thus still more susceptible to cracking and freeing from the kernels themselves.

For this step, it is again preferred to utilize a gas to affect the temperature change. The cooling gas may be air, but it is preferably an inert one such as carbon dioxide or nitrogen. A fluidized bed is also again particularly preferred. In addition to its expected advantages of even and rapid cooling, it has been discovered that a fluidized bed may contribute to the actual removal of skins (i.e. blanching) by causing a limited, but effective, degree of abrasion between the fluidized nuts.

Cooling should be sufficient to reduce the temperature of the nut kernels to less than 35° C., preferably less than 25° C. Temperatures substantially lower may be employed, but ones less than 0° C. are generally avoided to guard against freezing. This reduction in temperature should commence immediately after the heating step is concluded and is preferably accomplished in less than 5 minutes for maximum efficiency. A cooling gas at about the target temperature may be used. The relative humidity of the cooling gas is preferably at least 25%.

Although both the above heating and cooling steps of the thermal treatment are described particularly in the context of employing heating and cooling gases, this is not necessary. These gases are emphasized because they conveniently allow uniform and simultaneous treatment of large volumes of nut, while minimizing many problems of heat transfer to and from the nuts. Other fluids or means may be substituted with appropriate and conventional modification for their efficiencies.

One means by which problems of too severe of a thermal treatment on the kernel compositions may be avoided is through monitoring the moisture and/or oil content of skins removed during blanching. The closer the oil content of the skin is to its natural oil content (from 8 to 15%, although usually about 10% on a skin weight basis), the more desirable it is. With more severe treatments the oil from the kernel is exudated to the skin. Moisture content of the skin after they have attained equilibrium can be similarly used as an index of the severity of treatment. These skins desirably retain a moisture content of at least 4%, preferably at least about 5.5% by weight, after a proper thermal treatment. This prevents exudation of nut oil. The moisture content of peanuts may generally be in the range from about 4 to 8% and ordinarily will be from 5–7% for commercially available peanuts. Raw peanuts having a moisture less than about 4% are not commercially acceptable due to poor structure and organoleptic characteristic material and are not a starting material within the scope of this invention.

Once cooled, the nuts may be blanched and, if desired, further treated in essentially conventional manner. Throughout most of these additional steps, however, the effects of the thermal treatment are evident. These additional steps are generally more readily and more accurately performed than has heretofore been possible.

In blanching, for example, the skins are simply removed by only mild and brief exposure to conventional conditions. For example, light mechanical abrasion readily separates the skins and kernels. Moreover, the kernels themselves do not (particularly as compared to prior art roasted nuts being blanched) exhibit the customary tendency to crumble or disintegrate so as to interfere with subsequent steps, particularly sorting. The separated skins may then be removed completely by vacuum or blown air classification. When the blanched nuts are peanuts it is preferable that they contain at least 4.5% moisture after blanching. It is also preferable that the peanut kernels have a moisture loss of less than 0.5%.

After blanching, it is customary to sort the skinless kernels. This step is of importance in ensuring a homogeneity of appearance in the final nuts by removing undesirable and damaged (off-colored) kernel. Additionally (and of particular importance in the production of spreads, like peanut butters) it affords a means of removing aflatoxin or otherwise contaminated nuts.

Sorting may be accomplished using conventional means, usually manual or electronic. Greater resolution is here available, however, due largely to the fact that the raw, blanched nuts are pale or more nearly white as compared, for example, with conventional roasted and blanched nuts.

After the nuts have been sorted, they may—with or without being roasted, depending upon intended use—be sold. For those which are first to be roasted however, any conventional apparatus and conditions may be utilized because the original thermal treatment effects minimal alteration in the chemical or physical structure of the edible kernels.

The absence of alteration of the kernels processed in accordance with the present invention may be seen, for example, in the subsequent processing required for peanut butters. Blanched and sorted peanuts may simply be roasted (but preferably at slightly less severe conditions to compensate for the reduced particle size due to splitting of the kernels during blanching and the beleaved absence of normal skin insulating effects) and ground (or, alternatively, ground and then roasted) blended with conventional additives, chilled and packed. The resultant product peanut butters and spreads evidence no significant organoleptic differences from the ones produced by conventional commercial processes. They do, however, exhibit an increase in yield due to the present invention.

The examples which follow are illustrative of the present invention and are not intended to be limitative. Unless otherwise indicated, all proportions herein are based upon weight.

EXAMPLE I

A series of thermal treatments of raw peanuts was conducted under the following conditions. The peanuts were arranged for pre-blanching treatment in a Procter & Schwartz roaster at a bed depth of about 2.5 cm with the air velocity set at 21.34 m/s. Air temperature was varied from 125° C. to 175° C. and heating time, from 30 to 180 seconds during the series. After each heating time, the nuts were air chilled to about 20° C. in less than 5 minutes. Thereafter the raw blanched peanuts were roasted in a conventional manner in the Procter & Schwartz roaster at a bed depth of about 5.1 cm and with the velocity at 12.19 m/s.

Examples of the thermal treatment and the resulting blanching efficiency of the nuts treated this way and their flavor characteristics after roasting are presented in Table 1.

TABLE 1

| TRIAL NUMBER | AIR TEMPERATURE C.° | TREATMENT TIME (SEC.) | BLANCHING EFFICIENCY (%)* | HEDONIC RESPONSES | |
|---|---|---|---|---|---|
| | | | | ROASTED PEANUT FLAVOR | OVERALL LIKING |
| 1 | 138 | 45 | 93.18 | 4.94 | 5.51 |
| 2 | 160 | 120 | 94.99 | 5.24 | 5.37 |
| 3 | 149 | 75 | 98.43 | 5.27 | 5.10 |
| 4 | 138 | 120 | 96.42 | 5.05 | 5.71 |
| 5 | 160 | 45 | 96.48 | 5.17 | 5.62 |
| 6 | 127 | 75 | 93.56 | 4.64 | 5.04 |
| 7 | 149 | 180 | 94.99 | 5.24 | 5.37 |
| 8 | 149 | 30 | 87.30 | 5.43 | 5.44 |
| 9 | 171 | 45 | 97.40 | 4.37 | 5.18 |
| 10 | Control | | | 4.35 | 5.61 |
| | (Roasted with skins intact and then blanched) | | | | |

*"Blanching efficiency" is defined as the weight of blanched peanuts expressed in percent of the total weight of treated peanuts and "flavor characteristics" were expressed on the 9-point hedonic scale (1 = poor, 9 = excellent).

Figure 2:
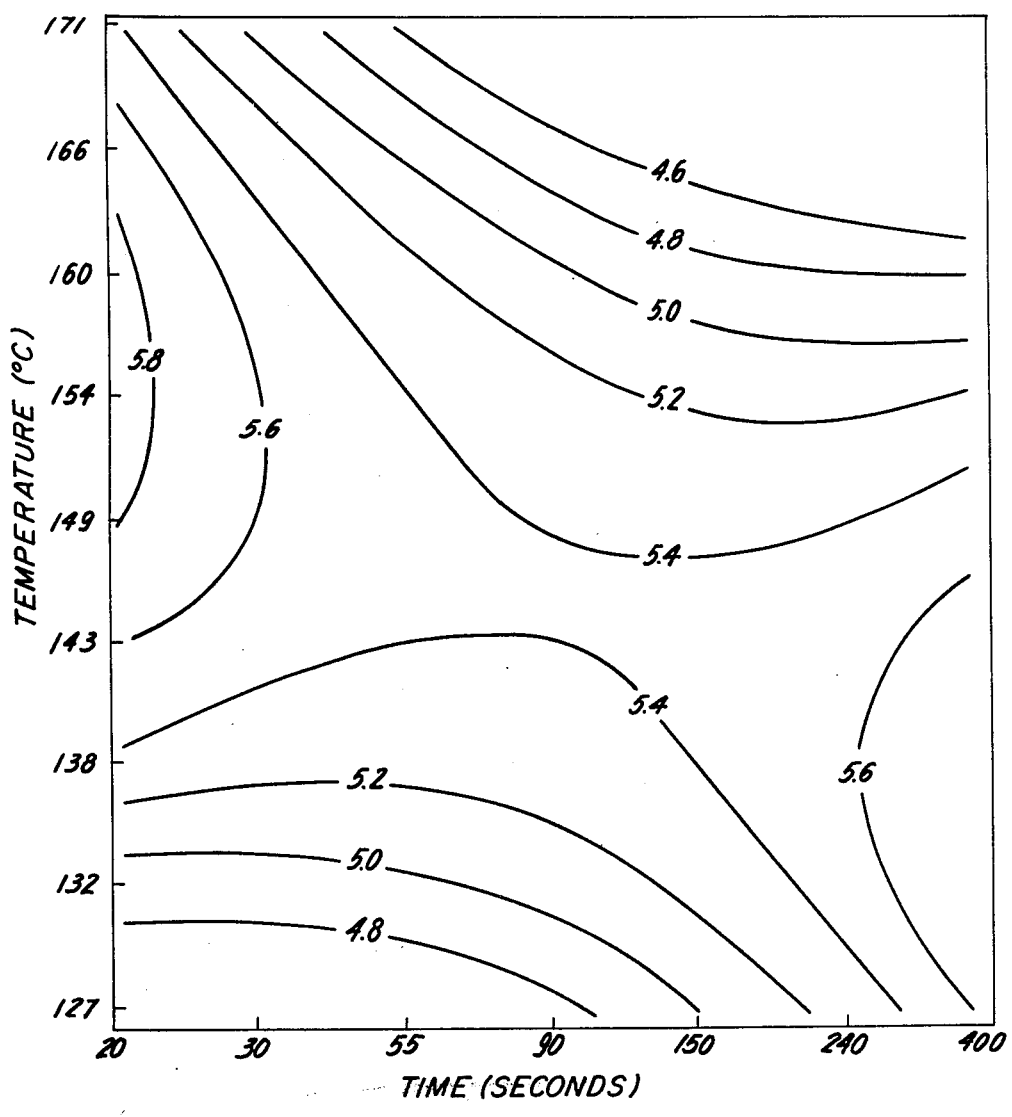
FIG. 2 is a response plot for peanut flavor as a function of treatment time and temperature.

Using these data, mathematical equations were developed to predict the respective response. The multiple correlation coefficients for the equations predicting the blanching efficiency and the peanut flavor intensity were 0.973 and 0.968 respectively. The response surface contours for blanching efficiency and for peanut flavor intensity generated from these equations as a function of time and temperature are shown in FIGS. 1 and 2 respectively. It is noted that the time coordinate in each figure is expressed on a logarithmic scale. This is consistent with the equations that express the drying phenomenon.

The surface color of the thermally treated samples was also evaluated after blanching. For various treatment parameters, the color characteristics are given in Table II. The rancidity (peroxide value) for similarly treated samples held for 14 days at 21°-22° C. after blanching is also given in Table II. These results show that in terms of either of these two characteristics the nuts were not altered significantly.

TABLE II

| SAMPLE | TEMPERATURE °C. | TIME (SEC.) | PEROXIDE VALUE | SURFACE BROWNING* |
|---|---|---|---|---|
| 1 | 138 | 45 | 0.2 | 46.0 |
| 2 | 160 | 120 | 0.4 | 43.0 |
| 3 | 149 | 75 | 0.4 | 45.7 |
| 4 | 138 | 120 | 0.3 | 44.6 |
| 5 | 160 | 45 | 0.3 | 44.6 |
| 6 | 127 | 75 | 0.3 | 43.0 |
| 7 | 149 | 180 | 0.4 | 41.6 |
| 8 | 149 | 30 | 0.2 | 47.2 |
| 9 | 171 | 45 | 0.3 | 44.1 |
| 10 | Control | | 0.2 | 47.0 |
| | (Raw, hand-blanched peanuts) | | | |

*Expressed as reflectance on the "green" scale of the Du-color System, Manufactured by Neotec Instruments, Inc., Rockville, Maryland.

As is evident from Table II, there is a minimum of chemical and physical alteration of the peanuts blanched in accordance with this process as compared to raw unblanched nuts. Thus, for further use and processing, or for immediate consumption, they contain the characteristics that make the peanuts desirable.

This table shows that by proper selection of preblanching treatment temperature and time, peanuts with surface color approximating unblanched peanut kernels can be achieved. This is significant not only because the peroxide values indicate a lesser likelihood of rancidity, but also because such peanuts may be sorted to remove aflatoxin contaminated kernels with greater ease. This is an improvement over prior blanching which involved significant browning or discoloration of the peanut kernels.

The samples shown in Table II correspond to the identical sample numbers in Table I. After heat treatment and blanching the raw peanuts were stored at room temperature (21°-22° C.) for 14 days. At the end of the holding period tests of the peroxide value and surface browning were made to determine rancidity and physical discoloration respectively.

Figure 3:
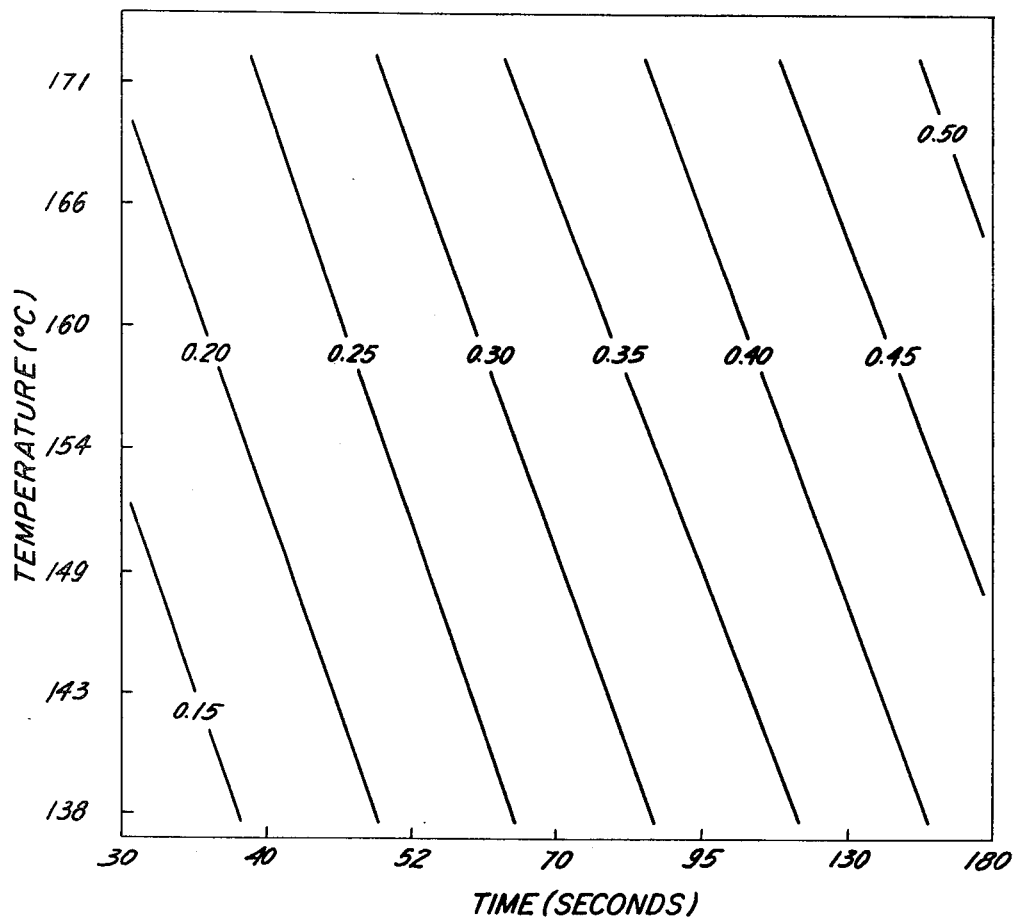
FIG. 3 is a response plot of peroxide values of peanuts stored under controlled conditions after blanching as a function of treatment time and temperature.

Using these data from Table II, the response surface contours of FIG. 3 were plotted for the peroxide values of the nuts. These suggest that the shorter the duration of the thermal exposure, the longer the expected shelf life of the raw nuts. This is due to the fact that there is a tendency for the peroxide value to increase during storage and a more severe treatment triggers a more rapid rate of oxidative rancidity.

EXAMPLE II

Using the process of Example I, peanuts are subjected to thermal treatment and blanched. The peanuts were then roasted such that the roast color would be equivalent to that of conventionally roasted peanuts. The resultant blanching efficiency and flavor responses are presented in Table III, which also gives the percent fat content and moisture content of the testa removed by blanching of thermally treated nuts.

TABLE III

| SAMPLE | THERMAL TREATMENT | | | HEDONIC RESPONSES | | SKIN CHARACTERISTICS | |
|---|---|---|---|---|---|---|---|
| | TEMPERATURE °C. | TIME (SEC.) | BLANCHING EFFICIENCY (%) | ROASTED PEANUT FLAVOR | OVERALL LIKING | TOTAL FAT CONTENT (%) | EQUILIBRIUM MOISTURE CONTENT (%) |
| 11 | 143 | 90 | 93.58 | 5.05 | 5.28 | 12.52 | 5.61 |
| 12 | 149 | 45 | 89.92 | 4.98 | 5.26 | 9.47 | 6.26 |
| 13 | 149 | 120 | 93.60 | 5.66 | 5.78 | 12.28 | 5.70 |
| 14 | 171 | 60 | 94.92 | 4.91 | 4.82 | 12.87 | 5.30 |
| 15 | Control | | | 5.40 | 5.86 | 20.97 | 3.33 |
| | (Roasted with skins intact and then blanched) | | | | | | |

It may be noted that there is a direct relationship between the severity of thermal treatment and the oil content of the skin. The more severe the thermal treatment, the lower the moisture content of the skin and the greater the degree of undesirable oil exudation from the kernel to the skin. After conventional roasting, for example, skins have about 8% higher oil content (based on the weight of skins). This represents a substantial organoleptic change in the structure of the native kernel composition.

It is evident from these studies that the most efficient blanching, best sensory qualities of the blanched-roasted nuts, least exudation of oil to the skin and least browning of kernel occur when the heat treatment is carried out at between from about 143° C. to about 155° C. for a time of from about 45 seconds to about 120 seconds.

EXAMPLE III

A batch of raw jumbo runner peanuts having an aflatoxin content (based on standard sampling procedures) of 24 parts per billion was divided into equal weight portions for use as control and tests samples for producing peanut butters. The control sample peanuts were roasted immediately in conventional manner. The test sample peanuts are given a thermal treatment in a Jet Zone roaster (a continuous-type, fluidized bed dryer/roaster). In the roaster, the peanuts formed a bed 5.1 centimeters deep which was fluidized by an 41.66 meter/second flow of 149° C. air. Residence time for the peanuts during treatment was 60 seconds. In a continuous stream, at the end of the heating cycle, the heated nuts were fluidized in a 39.6 meter/second flow of air having a temperature of 14° C. and a relative humidity of 35%. This treatment cooled the nuts to about 27° C. within 75 seconds.

The raw, thermally treated peanuts were then mechanically blanched and conveyed for electric sorting. The background plates and filters for the ICORE electronics sorters were adjusted for the most efficient color separation conditions for raw, white, blanched peanuts, i.e., tricolor color blue (Kodak No. 47) filters were mounted for high contrast effect on separation of discolored material against "yellow-orange" filters which are used in separation of off-colored material from roasted peanuts and which increases contrast in blue coloration only. The control sample was also sorted, but under conditions conventional for roasted peanuts. The specific machine conditions for both the test and the control samples are shown below.

TABLE IV

| MACHINE ADJUSTMENT/ SELECTION | LOT SORTED | |
|---|---|---|
| | TEST SAMPLE | CONTROL SAMPLE |
| Filter (Kodak Wratten No.) | 47 (Blue) | 22 (Yellow Orange) |
| Background Plate No. | 10 | 8 |
| Feed rate (first pass machines), lb./min. | 4 | 4 |
| Sensivity Setting | 80 | 80 |
| Reject Setting | "Dark" only | Dark & Light |

After sorting, the raw blanched test peanuts were conveyed to the feeder-hopper of the Proctor and Schwartz roaster. The roasting and subsequent cooling parameters for both the test and the control peanuts to maintain a roast color of 25 (Neotec "Green" scale) for each product are given in the following table.

TABLE V

| ROASTER CONDITIONS | TEST SAMPLE | CONTROL SAMPLE |
|---|---|---|
| Air Temperature, °C. | | |
| Zone 1 | 169 | 172 |
| Zone 2 | 168 | 171 |
| Bed Depth, Centimeters | | |
| Channel 1 | 5.1 | 5.1 |
| Channel 2 | 5.1 | 5.1 |
| Total Residence Time, Min. | 21 | 21 |
| Mean Temperature of Cooling Air, °C. | 14 | 16 |
| Mean Relative Humidity of Cooling Air, % | 37 | 40 |
| Temperature of Cooled Peanuts, °C. | 28 | 29 |

The moisture and characteristics of the test peanuts were as follows:

TABLE VI

| SAMPLE DESCRIPTION | MOISTURE | FAT | PEROXIDE VALUE |
|---|---|---|---|
| Incoming sample, test and control runs | 6.58 | 43.77 | 9.0 |
| Test Sample after heat treatment | 6.48 | 45.13 | 12.6 |
| Test sample after blanching (kernel only) | 5.58 | 47.91 | 23.8 |
| Control sample, roasted and blanched | 1.00 | 51.33 | 18.6 |

This table indicates that blanching can be commenced with the removal of an almost insignificant amount of moisture from the total peanut. Removal of the skins, nib and germ accounts for a portion of the moisture difference after heat treatment and after blanching.

The roasted test peanuts were then ground, mixed and packed in conventional manner. The control peanuts were roasted, blanched and sorted and then ground, mixed and packed in the same conventional manner.

The color readings (using Neotec Color Guard) on the samples were as follows:

TABLE VII

| PEANUT BUTTER SAMPLE | MEAN "NEOTEC" COLOR | | |
|---|---|---|---|
| | GREEN | RED | BLUE |
| Test Sample | 24.8 | 32.3 | 9.3 |
| Control Sample | 24.5 | 32.1 | 9.1 |

These color readings show essentially no perceptible color difference between the two products.

These samples were subjected to sensory evaluation for overall flavor intensity, peanut flavor intensity, harshness, sweetness and degree of overall liking. The degree of liking was evaluated on a nine-point Hedonic Scale, whereas the other four attributes were evaluated using a continuous scale wherein one is none and nine is extreme and five is ideal. The following table (Table VIII) summarizes the mean scores for the various attributes of the two samples. They indicate the two samples do not differ significantly when evaluated at storage periods of 5, 30 and 55 days. It may be pointed out that a directional preference toward the test sample was observed after 55 days of storage, even though the difference were not significant.

TABLE VIII

SENSORY EVALUATION SCORES FOR PEANUT BUTTER MADE IN ACCORDANCE WITH INVENTION

| SENSORY ATTRIBUTE | AGE OF SAMPLE (DAYS) | RATING ON 1-9 SCALE TEST SAMPLE | CONTROL SAMPLE |
|---|---|---|---|
| Overall Flavor | 5 | 4.51 | 4.57 |
| Intensity | 30 | 4.69 | 4.36 |
|  | 55 | 5.38 | 5.15 |
| Peanut Flavor | 5 | 4.04 | 4.57 |
|  | 30 | 4.03 | 4.33 |
|  | 55 | 5.36 | 5.04 |
| Harshness | 5 | 3.02 | 2.12 |
|  | 30 | 3.03 | 2.76 |
|  | 55 | 2.38 | 2.08 |
| Sweetness | 55 | 3.58 | 3.16 |
| Overall Liking | 5 | 6.35 | 6.45 |
|  | 30 | 6.10 | 6.25 |
|  | 55 | 6.89 | 6.15 |

Further tests were undertaken by additional panelists who indicated no significant differences in terms of the degree of liking, the strength of peanut flavor, color, sweetness, bitterness (harshness) and spreadability. The following table (Table IX) shows the scores received on these attributes.

TABLE IX

| ATTRIBUTE | MEAN SCORE* TEST SAMPLE | CONTROL SAMPLE |
|---|---|---|
| Degree of Liking | 6.97 | 6.93 |
| Strength of Peanut Flavor | 2.75 | 2.75 |
| Color | 2.90 | 3.00 |
| Sweetness | 2.78 | 2.87 |
| Bitterness | 1.24 | 1.28 |
| Spreadability | 3.06 | 2.94 |

*Degree of Liking is based on 9 point Hedonic scale. Strength of Peanut Flavor, Color, Sweetness and, Spreadability are based on a 5 point scale where 3.0 is the most desirable level of the attribute. Bitterness is based on a 3 point scale where 1 represents "just right" and 3 refers to "too bitter".

A comparison of the various weight fractions from the two processes is made in Table X which indicates that 90.8% of the test sample peanuts is recovered as useful product compared to 89.4% recovered from the control sample. Differences of 0.4% and 0.9% were attributed to the differences in the breakage among the nibs and skins respectively. Due to shear and compressive forces under the blancher belts the roasted peanuts are more likely to be cracked and eroded to give rise to additional "fines" and broken kernels.

TABLE X

| PRODUCT OR BY-PRODUCT | WEIGHT PERCENT TEST RUN | CONTROL RUN |
|---|---|---|
| Incoming Weight | 100.00 | 100.00 |
| Nib Hearts | 1.497 | 1.885 |
| Skins | 2.092 | 2.907 |
| Fines | 0.217 | 0.180 |
| Moisture Loss* | 5.36 | 5.58 |
| Raw Blanched Peanuts | 95.294 | — |
| Roasted Peanuts Prior to Sorting** | 90.834 | 89.448 |

*Moisture loss represents amount of moisture and other volatiles leaving the system during processing (roasting).
**Both figures are based on computed values. The figure for the trial run is projected because the off colored material was sorted out prior to roasting.

Table XI compares the compressive strength of individual raw and roasted peanuts. The bio yield force (indicating first rupture point) for the roasted, control peanuts was only half as much as for the raw, test peanuts. Accordingly the conventionally roasted kernels are more fragile and a substantially higher portion of the useful kernel is lost with the skins and nibs when blanching roasted peanuts.

TABLE XI

BIO YIELD FORCE (KG.) FOR KERNELS SUBJECTED TO COMPRESSION

| SAMPLE | WHOLE KERNEL RAW | CONTROL SAMPLE | TEST SAMPLE | BLANCHED SPLIT HALVES CONTROL SAMPLE | TEST SAMPLE |
|---|---|---|---|---|---|
| 1 | 7.6 | 6.4 | 5.2 | 2.0 | 4.2 |
| 2 | 7.6 | 2.4 | 3.6 | 1.2 | 5.0 |
| 3 | 7.6 | 1.4 | 7.0 | 2.8 | 4.8 |
| 4 | 5.4 | 1.4 | 5.2 | 4.6 | 4.6 |
| 5 | 8.4 | 2.8 | 8.4 | 2.2 | 4.6 |
| 6 | 10.5 | 4.5 | 7.4 | 1.4 | 4.2 |
| 7 | 8.0 | 1.4 | 5.8 | 2.6 | 6.2 |
| 8 | 6.0 | 2.8 | 6.4 | 1.6 | 6.0 |
| Mean | 7.64 | 2.89 | 6.13 | 2.30 | 4.95 |
| S. D. | 1.540 | 1.766 | 1.504 | 1.084 | 0.761 |

In electronic sorting of the roasted, control product, there was a considerably higher rejection of good-acceptable material as compared to raw-blanched samples. The total weight of the discards in the control sample was about 3.4% compared to only 1.5% in the test sample.

TABLE XII

AMOUNT OF PEANUTS REJECTED BY ICARE SORTER AND HAND PICKOUTS OF CONTROL AND TEST SAMPLES

| SORTING OPERATION | REJECTED MATERIAL EXPRESSED AS PERCENT OF RAW MATERIAL IMPACT CONTROL SAMPLE | TEST SAMPLE |
|---|---|---|
| First Pass Sorting | * | * |
| Second Pass Sorting | 1.327 | 0.567 |
| Third Pass Sorting | 1.958 | 0.800 |
| Hand Pickouts | 0.099 | 0.103 |
| Total Percent of "Off Color" Discards | 3.379 | 1.470 |

*Because "reject" product from the first pass sorter is blanched and resorted during the second pass, no product is eliminated from the process stream in the first pass.

An evaluation of the reject material shows that up to 50% of the reject stream comprises material which is "good acceptable", but which has developed off-coloration due to over-roasting (Table XIII).

TABLE XIII

| Characteristics of Rejects | Control Run, Rejects 1st Pass | 2nd Pass | 3rd Pass | Hand Pickouts | Test Run, Rejects 1st Pass | 2nd Pass | 3rd Pass | Hand Pickouts |
|---|---|---|---|---|---|---|---|---|
| Weight of Rejects (g)/100 g of Raw Peanuts Input | — | 1.327 | 1.958 | 0.099 | — | 0.567 | 0.800 | 0.103 |

TABLE XIII-continued

| | Control Run, Rejects | | | | Test Run, Rejects | | | |
|---|---|---|---|---|---|---|---|---|
| Characteristics of Rejects | 1st Pass | 2nd Pass | 3rd Pass | Hand Pickouts | 1st Pass | 2nd Pass | 3rd Pass | Hand Pickouts |
| Good "Acceptable" Material | 0.3177 | 0.2820 | 0.3243 | .2534 | .4060 | 0.0988 | 0.2320 | .1488 |
| Foreign Material | 0.0027 | 0.0107 | 0.0 | .0026 | — | — | 0.0 | .0028 |
| Immature | — | — | — | .0384 | .0074 | 0.0132 | 0.0314 | .0790 |
| Unblanched | 0.0366 | 0.0518 | .0585 | .1189 | .5373 | .7972 | .6513 | .6213 |
| Underroasted | 0.2241 | 0.0785 | .0649 | .2259 | — | — | — | — |
| Overroasted | 0.3585 | 0.4703 | .5149 | .2939 | — | — | — | — |
| Major/Minor Defects | 0.0307 | 0.1067 | .0349 | 0.0669 | .0402 | 0.0526 | 0.07512 | 0.1488 |
| Miscellaneous (Unshelled Deformed, etc.) | 0.0295 | — | — | .0024 | .0091 | 0.0380 | 0.0103 | 0.0106 |

The differences due to uneven roast do not exist in samples from the test run. The absence of confounding of roast variation with the damaged kernels accounts for the lower rejection rate in the test run. The lower weight of rejects in the test run also accounts for a higher concentration of aflatoxin in its reject stream (Table XIV).

TABLE XIV

Summary of Aflatoxin Analysis on the Samples Collected from Accept and Reject Streams of Control and Test Runs

| | Control Run PPB of: | | | | | Test Run PPB of: | | | | |
|---|---|---|---|---|---|---|---|---|---|---|
| Sample Description | $B_1$ | $B_2$ | $G_1$ | $G_2$ | Total A.T. | $B_1$ | $B_2$ | $G_1$ | $G_2$ | Total A.T. |
| 1. Incoming Sample | 4 | 0 | TR | 0 | 4 | 4 | 0 | TR | 0 | 4 |
| 2. Thermally Treated, Unblanched | | | | | | 3 | 0 | TR | 0 | 3 |
| 3. Blanched, not sorted (Control) | 2 | 0 | 0 | 0 | 2 | | | | | |
| 4. Accept, $A_1$ (1st Pass) | 5 | 2 | 2 | 0 | 9 | 6 | 2 | 1 | 0 | 9 |
| 5. Accept, $A_2$ (2nd Pass) | 3 | 0 | 2 | 0 | 5 | 13 | 2 | 5 | 0 | 20 |
| 6. Accept, $A_3$ (3rd Pass) | 2 | 0 | 2 | 0 | 4 | 4 | 0 | 2 | 0 | 6 |
| 7. Reject, $R_1$ (1st Pass) | 18 | 2 | 23 | 5 | 48 | 77 | 6 | 44 | 19 | 146 |
| 8. Reject, $R_2$ (2nd Pass) | 90 | 18 | 80 | 27 | 215 | 333 | 56 | 212 | 56 | 657 |
| 9. Reject, $R_3$ (3rd Pass) | 14 | 2 | 16 | 4 | 36 | 165 | 29 | 143 | 29 | 366 |
| 10. Hand Pickouts | 60 | 16 | 61 | 16 | 153 | 244 | 40 | 366 | 60 | 710 |
| 11. Peanut Butter | 1 to 2 | 0 | 0 | 0 | 1.5 | N | 0 | 0 | 0 | N |

$B_1$ = Aflatoxin $B_1$,
$B_2$ = Aflatoxin $B_2$,
$G_1$ = Aflatoxin $G_1$,
$G_2$ = Aflatoxin $G_2$,
A.T. = Aflatoxin It was thus be seen that to have an equivalent removal of contaminated nuts in the control and test processes, a much higher rejection rate was required than in the former process. Table XIII also shows that about 65% of the reject stream for the test run consisted of the unblanched peanuts which could be reduced by an additional blanching step or by modifying the blancher.

The finished products from both of the processes were practically free from aflatoxin. A sensory test shows that flavor and other characteristics are essentially the same on the trial and control products and the improvement in yield in the trial product was due to a better ability to distinguish between damaged or contaminated peanuts and good acceptable peanuts.

EXAMPLE IV

Another test was conducted of continuous processing of peanuts by heat treatment in a Jet Zone roaster for a period of 65–75 seconds at a temperature of about 149° C. The moisture content of the incoming peanuts was 5.88% and after the first treated peanuts which had a moisture of 4.57% on start up passed, the steady stream equilibrated at 5.68% moisture or a 0.2% moisture loss during pretreatment.

The peanuts so treated, were blanched and could be sorted as indicated in the prior example.

Peanut butter made with such peanuts was aflatoxin free.

What is claimed is:

1. A method for treating raw edible nuts having intact skins comprising:

(a) contacting said nuts for from 30 to 180 seconds with heated gas having a temperature of between 125° and 175° C.,
   (b) immediately chilling said heated nuts to below 35° C. within 5 minutes; and
   (c) blanching said chilled nuts to separate and remove their skins.

2. The method of claim 1, wherein the nuts are chilled to below about 25° C.

3. The method of claim 2, wherein the nuts and heated gas are contacted for between 45 and 120 seconds.

4. The method of claim 1, wherein the nuts are peanuts and heating is with gas at a temperature between 145° and 155° C. for 45 to 120 seconds.

5. The method of claim 1, wherein the skins removed during blanching have a moisture content of at least 4% by weight.

6. The method of claim 1, wherein the blanched nuts are sorted for removal of damaged and contaminated nuts.

7. The method of claim 6, wherein the sorted nuts are peanuts and said peanuts are roasted and then processed into peanut butter.

8. The method of claim 6, wherein the sorted nuts are peanuts and said peanuts are ground, roasted and then processed into peanut butter.

9. The method of claim 1 wherein the nuts are peanuts and the kernels of said peanuts contain at least 4.5% moisture after treatment.

10. The method of claim 1 wherein the nuts are peanuts and the moisture loss in the kernels of said peanuts is less than 0.5%.

11. The method of claim 1, wherein chilling is performed by contact with a cooling gas having a relative humidity of at least 25%.

* * * * *